United States Patent
Kugata

(10) Patent No.: US 9,769,013 B2
(45) Date of Patent: Sep. 19, 2017

(54) INFORMATION PROCESSING DEVICE THAT GENERATES PACKET INCLUDING FIRST AND SECOND IDENTIFIERS, TRANSMISSION AND RECEPTION DEVICE, AND CONTROL METHOD OF INFORMATION PROCESSING DEVICE

(71) Applicant: FUJITSU LIMITED, Kawasaki-shi, Kanagawa (JP)

(72) Inventor: Kouji Kugata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 297 days.

(21) Appl. No.: 14/658,682

(22) Filed: Mar. 16, 2015

(65) Prior Publication Data

US 2015/0281044 A1    Oct. 1, 2015

(30) Foreign Application Priority Data

Mar. 31, 2014    (JP) .................................. 2014-072110

(51) Int. Cl.
*H04L 1/00* (2006.01)
*H04L 12/24* (2006.01)
*H04L 1/08* (2006.01)
*H04L 1/16* (2006.01)
(Continued)

(52) U.S. Cl.
CPC ...... *H04L 41/0654* (2013.01); *G06F 13/4022* (2013.01); *H04L 1/08* (2013.01); *H04L 1/16* (2013.01); *H04L 1/1809* (2013.01); *H04L 1/1607* (2013.01)

(58) Field of Classification Search
CPC ......... H04L 41/0654; H04L 1/08; H04L 1/16; H04L 1/1607; G06F 13/4022
See application file for complete search history.

(56) References Cited

U.S. PATENT DOCUMENTS

2001/0013080 A1*  8/2001  Kameyama ........... G06F 13/387
                                                710/200
2002/0034182 A1*  3/2002  Mallory ................ H04L 1/1635
                                                370/394
(Continued)

FOREIGN PATENT DOCUMENTS

JP    2006-302250    11/2006
JP    2007-316755    12/2007

*Primary Examiner* — Clemence Han
(74) *Attorney, Agent, or Firm* — Staas & Halsey LLP

(57) ABSTRACT

A first communication device included in an information processing device stores, for each first identifier that is allocated for identifying a first packet, situation information indicating a second identifier that is allocated along with the first identifier, and updates the situation information on the basis of a reception result of a second packet indicating an execution result of processing that is requested by the first packet. Then, the first communication device determines the first identifier and the second identifier that are allocated to the first packet on the basis of the situation information and generates and transmits the first packet storing the first identifier and the second identifier that. A second communication device included in the information processing device transmits the second packet after storing the second identifier stored by the first packet in the second packet when transmitting the second packet as a response to the first packet.

5 Claims, 7 Drawing Sheets

(51) Int. Cl.
*G06F 13/40* (2006.01)
*H04L 1/18* (2006.01)

(56) References Cited

U.S. PATENT DOCUMENTS

| | | | |
|---|---|---|---|
| 2002/0161836 A1* | 10/2002 | Hosomi | H04L 29/06 709/203 |
| 2004/0103282 A1* | 5/2004 | Meier | G06Q 20/3674 713/171 |
| 2006/0218336 A1 | 9/2006 | Ishizawa et al. | |
| 2009/0292960 A1* | 11/2009 | Haraden | G06F 11/0745 714/699 |
| 2012/0079338 A1* | 3/2012 | Fujimoto | G06F 11/1004 714/749 |
| 2014/0140197 A1* | 5/2014 | Sadeghi | H04L 1/1812 370/216 |

* cited by examiner

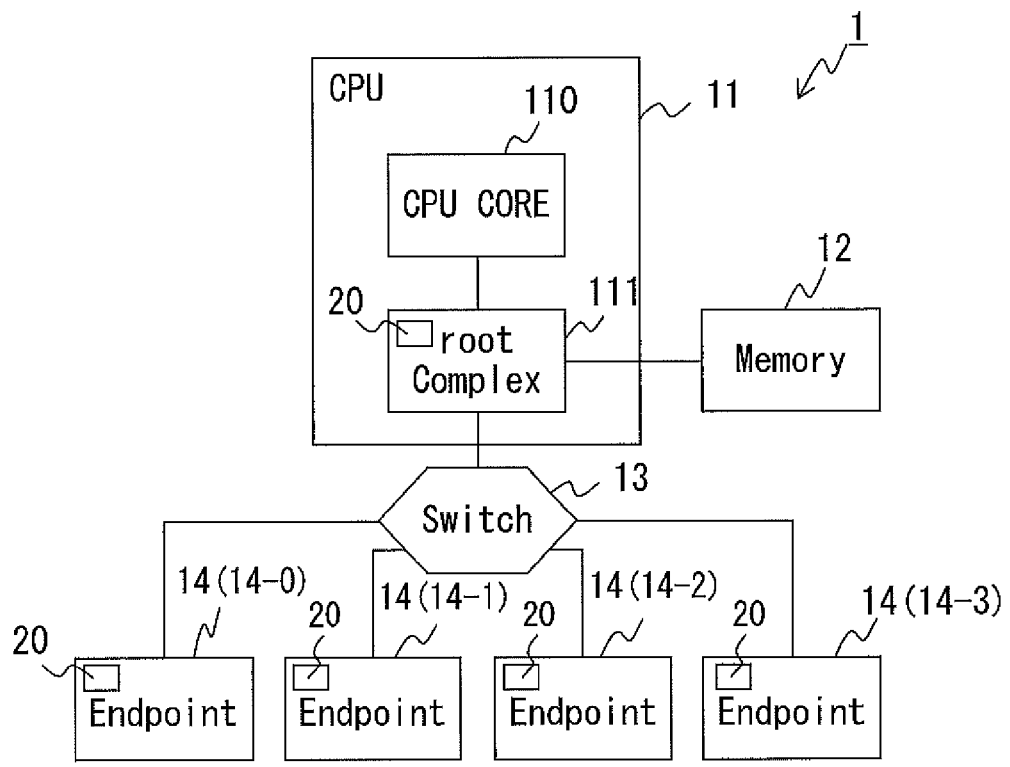
F I G. 1

|  | TagBusy | CTOinfo1 | CTOinfo2 |
|---|---|---|---|
| tag 0 | 0 | 0 | 0 |
| tag 1 | 0 | 0 | 0 |
| tag 2 | 0 | 0 | 0 |
| ⋮ | | | |
| tag n | 0 | 0 | 0 |

FIG. 3

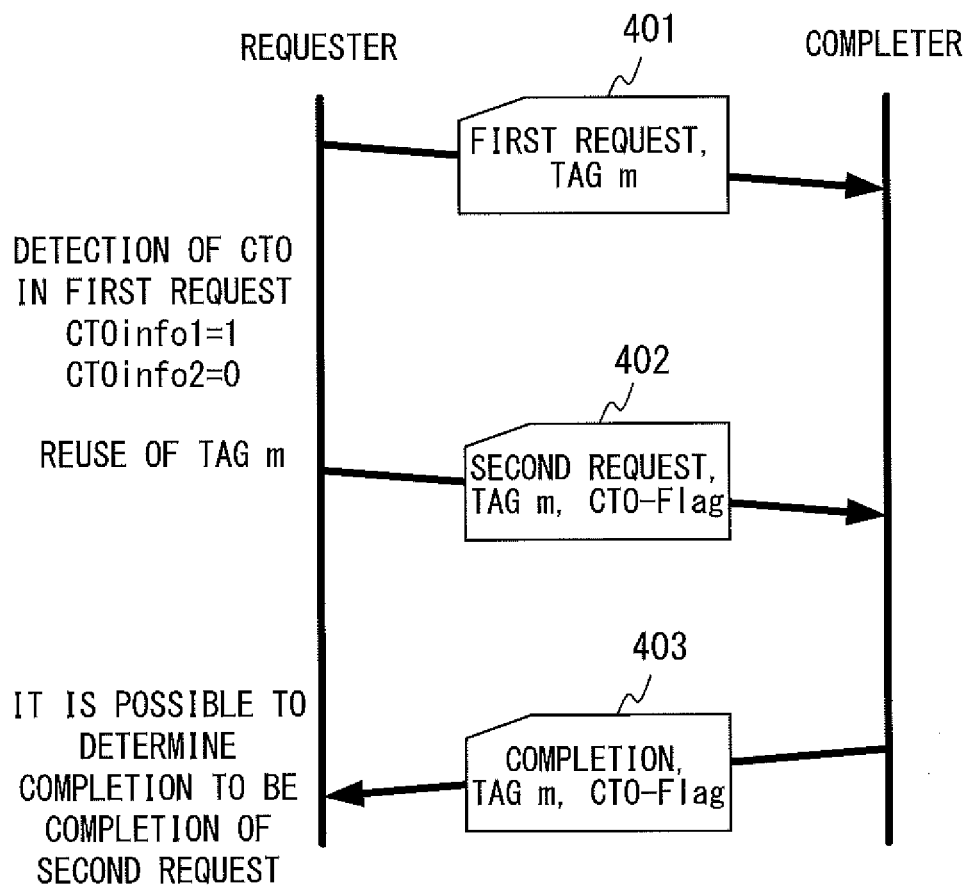
F I G. 4

| | | P0 | | | | | | | | P1 | | | | | | | | | P2 | | | | | | | | P3 | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 15 | 14 | 13 | 12 | 11 | 10 | 9 | 8 | 23 | 22 | 21 | 20 | 19 | 18 | 17 | 16 | 31 | 30 | 29 | 28 | 27 | 26 | 25 | 24 |
| R | Fmt | | Type | | | | | R | TC | | | Reserved | | | | TD | EP | Attr | | R | | Length | | LastDW BE | | | | 1stDW BE | | | |
| Requester ID | | | | | | | | | | | | | | | | Tag | | | | | | | | | | | | | | | |

F I G. 5

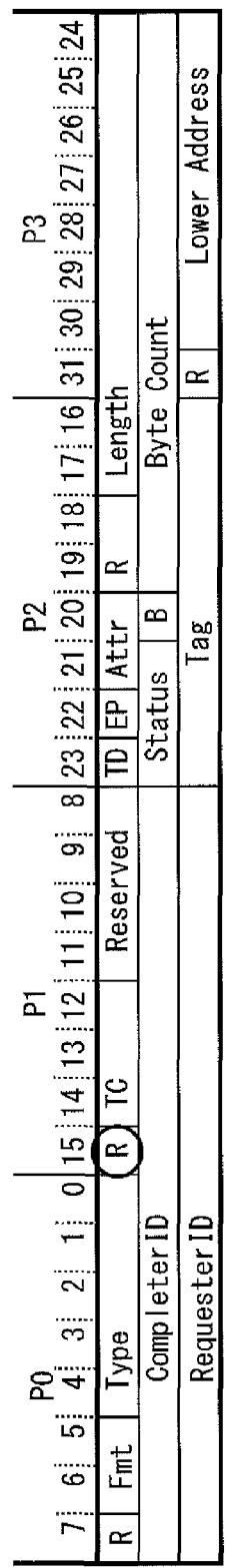
F I G. 6

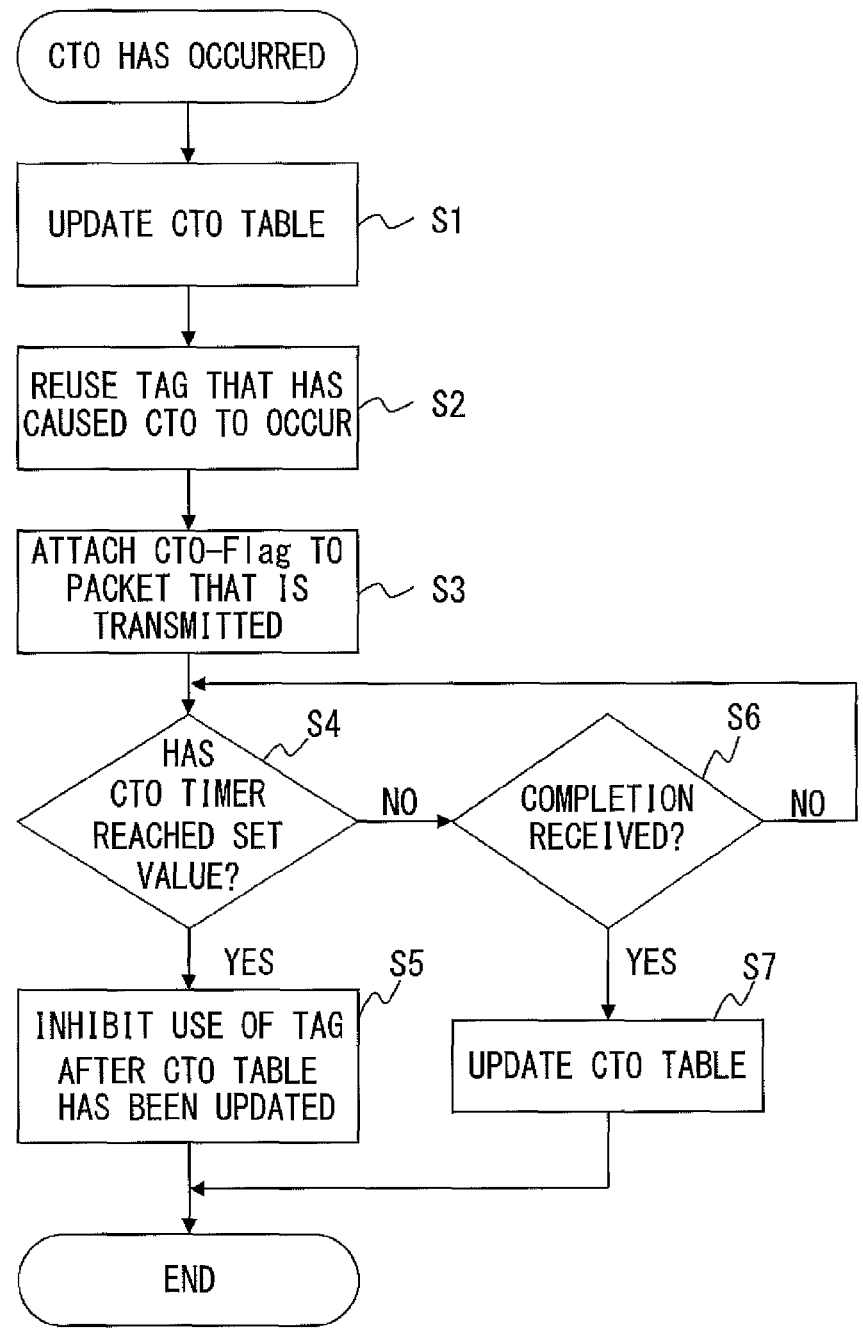
F I G. 7

INFORMATION PROCESSING DEVICE THAT GENERATES PACKET INCLUDING FIRST AND SECOND IDENTIFIERS, TRANSMISSION AND RECEPTION DEVICE, AND CONTROL METHOD OF INFORMATION PROCESSING DEVICE

CROSS-REFERENCE TO RELATED APPLICATION

This application is based upon and claims the benefit of priority of the prior Japanese Patent Application No. 2014-072110, filed on Mar. 31, 2014, the entire contents of which are incorporated herein by reference.

FIELD

The embodiments discussed herein are related to an information processing device, a transmission and reception device, and a control method of an information processing device.

BACKGROUND

A central processing unit (CPU) as an arithmetic operation processing device that is mounted on an information processing device acquires data from an input/output (IO) device and performs processing thereon. In the information processing device, communication between the CPU and the IO device is usually performed via a device for communication (hereinafter, described as a "communication device"). Specifically, the communication device is a bridge or a switch, etc.

Each communication device performs communication in accordance with adopted standards. In order to implement high-speed processing, high-speed data transmission is adopted. Because of this, in recent years, there have been cases where the PCI Express (PCIe) standards capable of high-speed data transmission have been adopted.

In PCIe, data communication is performed by using the split transaction method. By using the split transaction method, it is possible for a device (requester) on the side that makes a request for data to transmit another request after transmitting a packet (request) for making a request without the need to wait for reception of a response (e.g., a completion, which is a response to a read request) from a respondent (completer). Because of this, it is possible to perform communication using packets more effectively. Usually, the respondent is an IO device.

In the split transaction method, there is a case where one IO device processes a plurality of requests. In the case where those requests are read requests, there is a possibility that completions for those requests will be transmitted in an order different from the order of request transmission. Because of this, the requester identifies a relationship of correspondence between requests and completions. It is possible to identify the relationship of correspondence by storing an identifier, which is called a tag, in a request.

Tags are finite resources. The number of tags that can be used is, for example, 32 or 256. Because of this, a requester selects one from among tags that can be used and attaches the tag to a request. On the other hand, a completer attaches the same tag as that which is included in the request to a completion. Due to this, it is possible for the requester to uniquely associate the request with the completion.

The tag attached to the request is returned when the completion to which the tag is attached is returned and the tag can be used again. However, the tag is a finite resource, and therefore, in the case where there is no longer a tag that can be used, a requester generates no more requests and the issuance of a new request is stopped.

In Patent documents 1 and 2, the following contents are disclosed.

A unique node ID is set to each module that is connected by the PCI-Express. Further, a dedicated channel is provided for writing data to a destination module (PUT transfer) and for reading data from the destination module (GET transfer), respectively, and a channel ID is set to each channel. Then, the node ID and the channel ID are set within the address part of the header of a transaction layer packet that is transferred in accordance with the PCI-Express, and at the same time, a packet type for distinguishing between a request and a response is set.

Then, for data transfer, only a memory write request packet that is routed in address routing is used. In the case of a request, a response is made by always using a response packet (a memory-write request packet of a response type).

Patent document 1: Japanese Laid-open Patent Publication No. 2006-302250
Patent document 2: Japanese Laid-open Patent Publication No. 2007-316755

SUMMARY

According to an aspect of the embodiments, an information processing device includes an arithmetic operation processing device, a plurality of input/output devices, and a plurality of communication devices that perform communication between the arithmetic operation processing device and the plurality of input/output devices. A first communication device that belongs to the plurality of communication devices and that transmits a first packet includes: a storage circuit configured to store, for each first identifier that is allocated for identifying the first packet, situation information indicating a second identifier that is allocated along with the first identifier; a reception circuit configured to receive a packet that is addressed to the first communication device; an updating circuit configured to update the situation information stored in the storage circuit on the basis of a reception result by the reception circuit of a second packet indicating an execution result of the processing requested by the first packet; a determination circuit configured to determine the first identifier and the second identifier that are allocated to the first packet on the basis of the situation information stored in the storage circuit; and a first transmission circuit configured to generate and transmit the first packet including the first identifier and the second identifier that have been determined by the determination circuit. A second communication device that belongs to the plurality of communication devices and that is a transmission destination of the first packet includes a second transmission circuit configured to transmit the second packet after storing the second identifier stored by the first packet in the second packet when transmitting the second packet as a response to the first packet that has been transmitted by the first communication device.

The object and advantages of the embodiments will be realized and attained by means of the elements and combinations particularly pointed out in the claims.

It is to be understood that both the foregoing general description and the following detailed description are exemplary and explanatory and are not restrictive of the embodiments.

BRIEF DESCRIPTION OF DRAWINGS

FIG. 1 is a diagram explaining a configuration example of an information processing device according to embodiments;

FIG. 3 is a diagram explaining a configuration example of a CTO table;

FIG. 4 is a sequence diagram explaining an example of communication that is performed between a requester and a completer in the case where CTO is detected;

FIG. 5 is a diagram explaining a configuration of a request packet;

FIG. 6 is a diagram explaining a configuration of a completion packet; and

FIG. 7 is a flowchart illustrating a flow of an operation of a requester when the CTO is detected.

DESCRIPTION OF EMBODIMENTS

Figure 2:
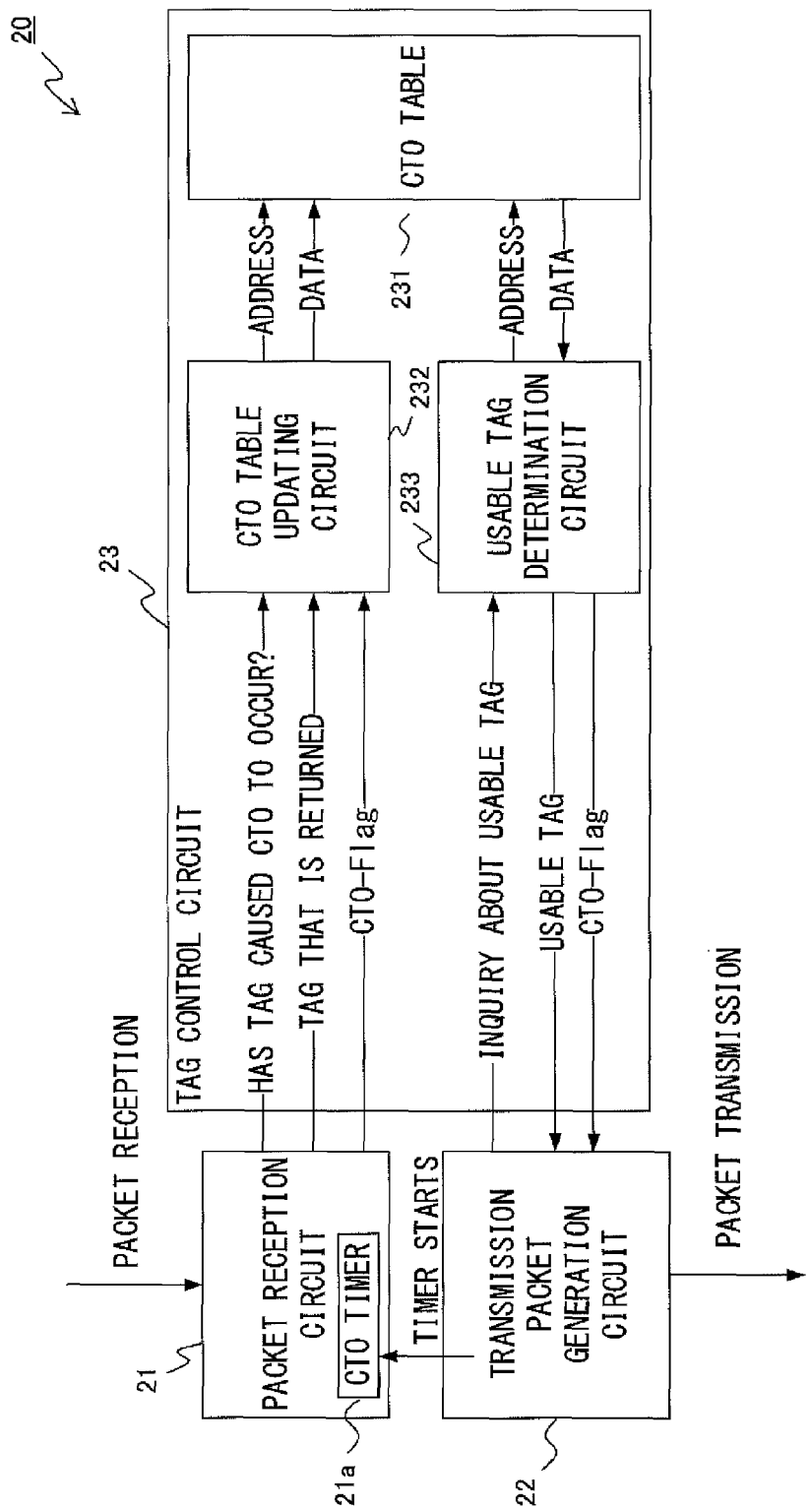
FIG. 2 is a diagram explaining a configuration example of a packet transmission and reception device.

Hereinafter, embodiments are explained in detail with reference to the drawings.

In an information processing device that performs data communication by using the split transaction method, there is a case where completion is not returned for some causes, such as a transmission error. The PCIe standards include a mechanism (an option) called Completion Timeout (CTO) for detecting the return of no completion. The CTO detects the return of no completion as an error in the case where no completion has been returned within a prescribed period of time. In the case where the CTO has occurred, the request is cancelled and the tag that has been attached to the request is returned. Hereinafter, the CTO is also used to mean an error type.

The CTO occurs in the case where a request or a completion is erased because of a transmission error or the like. However, there is a possibility that the CTO will occur due to other factors. An example of other factors is a delay in response due to a heavily loaded state on the completer side. In other words, there is a case where a completer in a heavily-loaded state transmits a completion after the requester side has detected the CTO.

The requester side issues a request again upon detecting the CTO. At the time of the detection of the CTO by the requester side, the tag of the request in which the CTO has occurred becomes usable. Consequently, there is a possibility that the tag of the request in which the CTO has occurred will be used in a different request from the request in which the CTO has occurred depending on the number of tags that can be used at that point in time, the number of requests that are issued at and after that point in time, etc. However, there is a possibility that a completion will be returned after the requester side has detected the CTO. This means that there is a possibility that the same tag will be attached to at least two requests whose request contents are different from each other and which are issued within a brief period of time.

As described above, there is a case where the completer side transmits completions in an order different from the order of the transmission of requests. Because of this, in the case where the same tag is attached to at least two requests whose request contents are different from each other and which are issued within a brief period of time, it is difficult for the requester side to uniquely associate a request with an appropriate completion. Because a processing result is not confirmed, the requester side will reissue a request. Reissuance of such a request will decrease the number of effective requests that the requester can issue in a unit of time, and therefore, will form a factor in degrading performance as a result.

By inhibiting the use of the tag of the request in which the CTO has occurred for a fixed period of time, it is possible to avoid attachment of the same tag to at least two requests whose request contents are different from each other and which are issued within a brief period of time. However, the tag is a finite resource, and therefore, inhibiting the use of a tag for a fixed period of time is equivalent to decreasing the number of requests that can be issued at the same time. Because of this, inhibiting the use of a tag for a fixed period of time will form a factor in degrading performance.

Consequently, it seems to be important to make it possible to appropriately identify the relationship of correspondence between requests and completions while avoiding the inhibition of the use of a tag, in other words, while avoiding a decrease in the number of requests that can be issued at the same time.

FIG. 1 is a diagram explaining a configuration example of an information processing device according to the present embodiment. As illustrated in FIG. 1, an information processing device 1 according to the present embodiment includes a CPU 11 as an arithmetic operation processing device, a memory (memory module) 12, a switch 13, and a plurality of endpoints 14 (14-0 to 14-3). The configuration example illustrated in FIG. 1 is just an example and the configuration of the information processing device 1 is not limited to the configuration example illustrated in FIG. 1.

The CPU 11 includes one or more CPU cores 110 and a root complex 111. In FIG. 1, only main components of the CPU 11 are illustrated. The configuration of the CPU 11 is also not limited to the configuration example illustrated in FIG. 1.

The endpoint 14 is a device that serves as an interface for connecting to an IO device. Specifically, the endpoint 14 is a graphic card, a local area network (LAN) card, or another controller, etc. In FIG. 1, an IO device that is connected to the endpoint 14 is not illustrated.

The switch 13 is, for example, a communication device that transmits data (packet) in accordance with the PCIe standards. The root complex 111 and each endpoint 14 are also communication devices that perform communication in accordance with the PCIe standards.

The root complex 111 and each endpoint 14 are communication devices that serve both as a requester that makes a request for processing and as a completer that performs requested processing in accordance with a situation. In other words, the root complex 111 and each endpoint 14 are communication devices that serve as a starting point or an endpoint of a packet that is transmitted in accordance with the PCIe standards. On the root complex 111 and each endpoint 14, a packet transmission and reception device 20 is mounted, which is a transmission and reception device according to the present embodiment.

FIG. 2 is a diagram explaining a configuration example of the packet transmission and reception device. As illustrated in FIG. 2, the packet transmission and reception device 20 includes a packet reception circuit (packet reception module) 21, a transmission packet generation circuit (transmission packet generation module) 22, and a tag control circuit (tag management module) 23. The tag control circuit 23 includes a storage circuit 231, a CTO table updating circuit 232, and a usable tag determination circuit 233.

The packet reception circuit 21 is a circuit for receiving a packet that is transmitted from the switch 13 and includes a timer (expressed as "CTO TIMER" in FIG. 2) 21a for detecting the CTO. The timer 21*a* starts timing via the control of the transmission packet generation circuit 22.

The transmission packet generation circuit 22 is a circuit configured to generate and transmit a packet. Instructions to generate a packet are given mainly by the CPU core 110 in the case where the requester is the root complex 111. In the case where the requester is the endpoint 14, a packet is generated by instructions given mainly by the connected IO device. The packet that has been received by the packet reception circuit 21 is output to the CPU core 110 capable of giving instructions to generate a packet or an IO device. Hereinafter, a device that gives instructions to transmit a packet to a requester or a completer is described as a "master device" for convenience.

In the case where the packet is a packet for making a request for processing (hereinafter, expressed as a "request packet"), a tag, which is a number used as an identifier, is attached to the request packet. The tag control circuit 23 is a circuit configured to manage a tag that is attached to the request packet. In the storage circuit 231, a CTO table for managing tags is stored.

FIG. 3 is a diagram explaining a configuration example of a CTO table. In FIG. 3, "0" to "2" and "n" attached to the right side of "tag" each indicate an actual number of each tag. In this manner, the CTO table has a configuration in which use situation information described as "TagBusy" and two pieces of CTO situation information described as "CTOinfo1" and "CTOinf2" are stored in one entry (record) for each tag.

TagBusy (use situation information) and each piece of CTO situation information, i.e., CTOinfo1 and CTOinfo2 are all 1-bit information. TagBusy is information indicative of whether or not the corresponding tag is in use. In FIG. 3, "0" indicates that the corresponding tag is not in use. In the case where the corresponding tag is in use, the value of TagBusy will be 1.

CTOinfo1 is information indicative of whether or not the request packet to which the corresponding tag is attached has caused the CTO to occur. In the present embodiment, to the request packet that is retransmitted because of the occurrence of the CTO, a one-bit flag (hereinafter, described as "CTO-Flag") that is another identifier different from a tag is attached. The value of the one-bit CTO-Flag is 1. CTOinfo2 is information indicative of whether or not the request packet to which the CTO-Flag is attached has caused the CTO to occur.

A completer that has received a request packet with the CTO-Flag attached attaches the same CTO-Flag to a packet that is a response to the request packet (hereinafter, described as a "completion packet"). Because of this, even if the requester receives the respective completion packets corresponding to the two request packets with the same tag attached, respectively, it is possible for the requester to appropriately identify the relationship of correspondence between the request packet and the completion packet on the basis of the CTO-Flag. The tag of the request packet in which the CTO has occurred can be reused immediately, and therefore, it is possible to avoid or prevent a decrease in the number of request packets that can be issued at the same time. Because of this, it is also possible to avoid or prevent deterioration in performance of the information processing device 1, which is caused when the issuance of a request packet is disabled. The relationship of correspondence between request packets and completion packets is identified by the packet reception circuit 21.

The CTO table updating circuit 232 updates the CTO table by using information that is input from the packet reception circuit 21.

In the case of generating and transmitting a request packet, the transmission packet generation circuit 22 starts the timer 21*a* and notifies the packet reception circuit 21 of the tag attached to the request packet and of the presence/absence of the CTO-Flag. Due to this, upon detecting the CTO, the packet reception circuit 21 identifies the tag attached to the request packet in which the CTO has been detected and the presence/absence of the CTO-Flag. The packet reception circuit 21 notifies the CTO table updating circuit 232 of the identified tag and of the presence/absence of the CTO-Flag as well as of the detection of the CTO. Upon receipt of a completion packet, the packet reception circuit 21 reports the tag of the received completion packet as a tag that is returned (so that the tag is made usable).

In the case where the detection of the CTO is reported from the packet reception circuit 21, the CTO table updating circuit 232 updates CTOinfo1 and CTOinfo2 stored in the entry of the reported tag in accordance with the reported presence/absence of the CTO-Flag. The updating is performed as follows.

(1) In the case where the CTO-Flag is not present and (CTOinfo1, CTOinfo2)=(0, 0), the results of the updating will be (CTOinfo1, CTOinfo2)=(1, 0).

(2) In the case where the CTO-Flag is present and (CTOinfo1, CTOinfo2)=(1, 0), the results of the updating will be (CTOinfo1, CTOinfo2)=(1, 1).

Case (1) is a case where the CTO has been detected in a request packet storing no CTO-Flag. In the present embodiment, when a tag is made usable by the reception of a completion packet, i.e., when the value of TagBusy is set to 0, both of the values of CTOinfo1 and CTOinfo2 are updated to 0. Because of this, in the case where the CTO has been detected in a request packet storing no CTO-Flag, each value of CTOinfo1 and CTOinfo2 is 0.

Case (2) is a case where, after the CTO is detected, the CTO is further detected in a request packet storing the CTO-Flag without receiving a completion of the request packet storing no CTO-Flag.

There can be another case where, after the CTO is detected, a completion of the request packet storing no CTO-Flag is received, and the CTO is further detected in a request packet storing the CTO-Flag. However, the tag is made usable by the reception of a completion, and after that, CTOinfo1 and CTOinfo2 are not updated at the time of the detection of the CTO or the reception of a completion packet. Because of this, this case is not considered here.

In the present embodiment, the use of a tag whose (CTOinfo1, CTOinfo2)=(1, 1) is inhibited temporarily. The reason is that there is a possibility that a factor other than the factor that causes a delay in reception of a completion will exist.

On the other hand, when the tag that is returned (so that the tag can be made usable) is reported from the packet reception circuit 21, the CTO table updating circuit 232 updates TagBusy that is stored in the entry of the reported tag to 0. Each value of CTOinfo1 and CTOinfo2 is updated to 0 regardless of the previous value as described above.

The transmission packet generation circuit 22 generates a request packet in response to a request from the master device and generates a request packet that is retransmitted in the case where the packet reception circuit 21 has detected the CTO. Further, the transmission packet generation circuit 22 generates a completion packet in response to a request from the master device.

The transmission packet generation circuit 22 that has been requested to transmit a request packet by the master device makes an inquiry about a usable tag to the usable tag determination circuit 233. The usable tag determination circuit 233 notifies the transmission packet generation circuit 22 of the usable tag and the presence/absence of the attached CTO-Flag in response to the inquiry. Because of this, the transmission packet generation circuit 22 attaches the tag specified by the usable tag determination circuit 233 to the request packet and also attaches the CTO-Flag if necessary. In the case where a usable tag does not exist, the usable tag determination circuit 233 notifies the transmission packet generation circuit 22 of the nonexistence of a usable tag and a request packet is not generated.

In the case where the packet reception circuit 21 has detected the CTO, the detection is reported to the transmission packet generation circuit 22 along with, for example, a tag. In response to the report, the transmission packet generation circuit 22 retransmits a request packet if necessary. In order to retransmit a request packet, for example, the transmission packet generation circuit 22 notifies the usable tag determination circuit 233 of the tag of the request packet in which the CTO has been detected and makes an inquiry about the presence/absence of the attached CTO-Flag to the usable tag determination circuit 233. Because of this, the transmission packet generation circuit 22 attaches the CTO-Flag to the request packet in the case where instructions to attach the CTO-Flag are given by the usable tag determination circuit 233.

The usable tag determination circuit 233 determines the presence/absence of the attached CTO-Flag on the basis of CTOinfo1 and CTOinfo2 as follows. Here, "CTO-Flag=0" indicates that the CTO-Flag is not attached and "CTO-Flag=1" indicates that the CTO-Flag is attached.

(a) In the case where (CTOinfo1, CTOinfo2)=(0, 0), CTO-Flag=0.
(b) In the case where (CTOinfo1, CTOinfo2)=(0, 1), CTO-Flag=0.
(c) In the case where (CTOinfo1, CTOinfo2)=(1, 0), CTO-Flag=1.
(d) In the case where (CTOinfo1, CTOinfo2)=(1, 1), the use of the tag is inhibited.

In the present embodiment, retransmission of a request packet is performed only once. In the situation where a request packet is retransmitted for the second time, i.e., in the situation where the CTO has occurred twice, i.e., where the CTO has occurred in all of the transmitted request packets, (CTOinfo1, CTOinfo2)=(1, 1). Because of this, the use of a tag whose (CTOinfo1, CTOinfo2)=(1, 1) is inhibited temporarily. In the case where (CTOinfo1, CTOinfo2)=(1, 1), the usable tag determination circuit 233 notifies the transmission packet generation circuit 22 of the abortion of the transmission of a request packet.

When an inquiry about a usable tag is made by the transmission packet generation circuit 22, the usable tag determination circuit 233 refers to the CTO table in the storage circuit 231 and searches for an entry whose value of TagBusy is 0. In the case where an entry whose value of TagBusy is 0 is not extracted in the search, the usable tag determination circuit 233 notifies the transmission packet generation circuit 22 of the search result. As a result of this, the transmission packet generation circuit 22 stops the generation of a request packet.

On the other hand, in the case where an entry whose value of TagBusy is 0 can be extracted in the search, the usable tag determination circuit 233 notifies the transmission packet generation circuit 22 of the tag of the extracted entry and updates the value of TagBusy of the entry to 1. The usable tag determination circuit 233 determines the presence/absence of the attached CTO-Flag on the basis of CTOinfo1 and CTOinfo2 of the entry and notifies the transmission packet generation circuit 22 of the determination result. At this time, each value of CTOinfo1 and CTOinfo2 is 0, and therefore, it is determined that the CTO-Flag is not attached.

In this manner, the CTO-Flag is allocated and attached (stored) to a request packet, in addition to a tag, in accordance with the situation. Because of this, even if the same tag is attached to a plurality of request packets in a brief period of time, it is possible for a requester to appropriately identify the relationship of correspondence between request packets and completion packets.

FIG. 4 is a sequence diagram explaining an example of communication that is performed between a requester and a completer in the case where the CTO is detected. Next, with reference to FIG. 4, the operations of a requester and a completer in the case where the CTO is detected are explained specifically. As described above, in the entry of a tag m that is not in use, TagBusy, CTOinfo1, and CTOinfo2 each having a value of 0 are stored.

In response to a request from the master device, the requester generates and transmits a first request packet 401, which is a request packet storing no CTO-Flag. The tag that has been attached to the first request packet 401 is the tag m. Because of this, the value of TagBusy in the entry of the tag m of the CTO table is updated from 0 to 1 by the usable tag determination circuit 233.

In the case where the first request packet 401 is not received by the completer due to a factor other than the factor that causes a delay, such as a transmission error, or a case where a completion that the completer has transmitted is not received by the requester due to some factors, the requester detects the CTO. As a result of this, in the entry of the tag m of the CTO table, the value of CTOinfo1 is updated from 0 to 1 by the CTO table updating circuit 232. After the updating, the requester generates and transmits a second request packet 402, which is a request packet storing the CTO-Flag. In the case where the completion of the second request packet 402 is not received by the requester, the requester detects the CTO. As a result of this, the value of CTOinfo2 in the entry of the tag m of the CTO table is updated from 0 to 1 by the usable tag determination circuit 233.

In the case of having received the second request packet 402, the completer transmits the second request packet 402 to the master device by using a protocol compatible with the master device. As a result of this, in the case where the master device makes a request for transmission of a completion, the completer transmits a completion 403. To this completion 403, the tag m and the CTO-Flag are attached.

The requester that has received the completion 403 associates the completion 403 with the second request packet 402 on the basis of the tag m and the CTO-Flag attached to the completion 403. As a result of this, in the entry of the tag m of the CTO table, each value of TagBusy, CTOinfo1, and CTOinfo2 is updated to 0 by the CTO table updating circuit 232.

In the case where the requester has received a completion storing no CTO-Flag as the completion 403, the received completion is associated with the first request packet 401 because the CTO-Flag does not exist.

The PCIe standards have established rules about the order of request packets and completion packets. According to the rules, the order of reception of completion packets having the same tag will not be changed. Because of this, it is known that the completion packet of the first request packet 401 does not exist on the packet transmission path, i.e., does not exist for some causes. Because of this, the same tag is attached to a request packet that is retransmitted. This makes it possible to check the existence of a completion packet for the request packet that was transmitted before.

By the attachment of the CTO-Flag, even if the same tag is attached to a plurality of request packets whose request contents are different, it is possible for the requester to appropriately identify the relationship of correspondence between request packets and completion packets. In order to make it possible to appropriately identify the relationship of correspondence between request packets and completion packets, it is preferable to save information indicative of a combination of the tag and the CTO-Flag that have been attached to each request packet. In the case where such information is used to identify the relationship of correspondence between request packets and completion packets, control becomes complicated and the load of the packet transmission and reception device 20 becomes heavier. Because of this, in the present embodiment, the same tag is attached to a request packet that is retransmitted.

FIG. 5 is a diagram explaining a configuration of a request packet and FIG. 6 is a diagram explaining a configuration of a completion packet. Here, with reference to FIG. 5 and FIG. 6, a method for attaching (storing) the CTO-Flag to a request packet and a completion packet according to the present embodiment is explained specifically.

In FIG. 5 and FIG. 6, only a header portion, which is part of a request packet and a completion packet, is illustrated. "R" described in FIG. 5 and FIG. 6 stands for "Reserved", which means a reserved bit.

In the present embodiment, as indicated by a circle in FIG. 5 and FIG. 6, respectively, the CTO-Flag is stored in the one bit reserved as the reserved bit in the sixteenth bit from the top of a header (Transaction Layer Packet (TLP) header). Usually, the value of the bit is 0, and therefore, the value of the CTO-Flag is set to 1.

For the generation of a header of a completion packet, usually, the contents of a header of a request packet are used. Commonly, the reserved bit in the header of a request packet is stored in the header of a completion packet as it is. Because of this, the CTO-Flag is stored in the completion packet corresponding to the request packet storing the CTO-Flag without the need to add special functioning to the completer.

To the completion packet, a "Completer ID" field, a "Status" field, etc., are added in comparison with the request packet. In the "Completer ID" field, data indicative of a device that has performed processing is stored, and in the "Status" field, data indicative of the processing result is stored. Because of this, it is possible for the requester to confirm the device that has performed the processing and the processing result from the completion packet.

FIG. 7 is a flowchart illustrating a flow of the operation of a requester at the time of the detection of the CTO. Finally, with reference to FIG. 7, the series of operations of the requester triggered by the detection of the CTO is explained in detail. In FIG. 7, request packets to which the same tag has been attached are focused on and the flow of the operation of the requester after the first detection of the CTO is excerpted and illustrated.

The CTO that has occurred is detected by the packet reception circuit 21 and is reported to the CTO table updating circuit 232 of the tag control circuit 23 along with the tag attached to the request packet in which the CTO has occurred and the presence/absence of the CTO-Flag. In response to the report, the CTO table updating circuit 232 updates the entry of the reported tag of the CTO table stored in the storage circuit 231 as in the case (1) (S1).

Upon detecting the CTO, the transmission packet generation circuit 22 determines the tag attached to the request packet (the first request packet 401 illustrated in FIG. 4) in which the CTO has occurred to be a tag that is reused for a request packet (the second request packet 402 illustrated in FIG. 4) that is retransmitted (S2).

After that, the transmission packet generation circuit 22 notifies the usable tag determination circuit 233 of the tag control circuit 23 of the determined tag and makes an inquiry about the presence/absence of the attached CTO-Flag. Here, the request packet in which the CTO has been detected is the first request packet 401, and therefore, the usable tag determination circuit 233 reports the attachment of the CTO-Flag. As a result of this, the transmission packet generation circuit 22 generates and transmits a request packet to which the CTO-Flag and the same tag have been attached (the second request packet 402 illustrated in FIG. 4) (the above is performed at S3).

The packet reception circuit 21 operates independently of the transmission packet generation circuit 22 and detects the CTO by using the timer 21a (S4). In the case where a CTO has been detected (YES at S4), the packet reception circuit 21 notifies the CTO table updating circuit 232 of the occurrence of the CTO, the tag attached to the request packet in which the CTO has occurred, and the presence/absence of the CTO-Flag. As a result of this, the combination of (CTOinfo1, CTOinfo2)=(1, 1) is settled and the use of the tag that has been reported to the CTO table updating circuit 232 is inhibited temporarily (S5). Then, the series of operations is completed.

On the other hand, in the case where the CTO has not been detected (NO at S4), the packet reception circuit 21 checks whether or not the completion packet has been received (S6). In the case where the completion packet has been received (YES at S6), the packet reception circuit 21 notifies the CTO table updating circuit 232 of the tag of the received completion packet as a tag that has been returned (made usable). As a result of this, each value of TagBusy, CTOinfo1, and CTOinfo2 in the entry of the tag is updated to 0 so that the reported tag is made usable (S7). Then, the series of operations is completed.

In the case where the completion packet has not been received (NO at S6), the packet reception circuit 21 detects the CTO by using the timer 21a (S4). Then, the requester waits until the CTO is detected or a completion packet is received.

In the present embodiment, the number of bits of the CTO-Flag is one, but the number of bits may be two or more. Further, the CTO-Flag is attached unconditionally to a request packet that is retransmitted, but it may also be possible to design an embodiment in which a tag that is attached to the request packet and the attachment of the CTO-Flag are determined in accordance with tag-use information, for example, the number of usable tags.

In the present embodiment, the number of CTO-Flags, which is an identifier different from a tag, is one, but the number of identifiers, such as the CTO-Flag, may be two or more. It may also be possible to design an embodiment in which the number of identifiers, such as the CTO-Flag that is used, or the number of bits is changed in accordance with a situation.

In the first request packet 401, the CTO-Flag is not actually attached. However, it may also be possible to design an embodiment in which an identifier such as the CTO-Flag is also attached to the first request packet 401.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   an arithmetic operation processing device;
   a plurality of input/output devices; and
   a plurality of communication devices configured to perform communication between the arithmetic operation processing device and the plurality of input/output devices, wherein
   a first communication device that belongs to the plurality of communication devices and that transmits a first packet includes:
   a storage circuit configured to store, for each first identifier that is allocated for identifying the first packet, use situation information indicating whether the first identifier is in use and situation information indicating a second identifier that is allocated along with the first identifier;
   a reception circuit configured to receive a packet that is addressed to the first communication device;
   an updating circuit configured to update the situation information stored in the storage circuit on the basis of a reception result by the reception circuit of a second packet indicating an execution result of processing that has been requested by the first packet, wherein the updating circuit sets the use situation information to indicate that the first identifier is in use when the first identifier is allocated for identifying the first packet and sets the use situation information to indicate that the first identifier is not in use when the second packet is received by the reception circuit;
   a determination circuit configured to determine the first identifier and the second identifier that are allocated to the first packet on the basis of the situation information stored in the storage circuit; and
   a first transmission circuit configured to generate and transmit the first packet storing the first identifier and the second identifier that have been determined by the determination circuit, and
   a second communication device that belongs to the plurality of communication devices and that is a transmission destination of the first packet includes a second transmission circuit configured to transmit the second packet after storing the second identifier stored by the first packet in the second packet when transmitting the second packet as a response to the first packet that has been transmitted by the first communication device.

2. The information processing device according to claim 1, wherein
   the reception circuit detects an error when the second packet is not received within a prescribed period of time after the first packet has been transmitted, and
   the updating circuit updates the situation information triggered by the detection of the error by the reception circuit.

3. The information processing device according to claim 1, wherein
   when retransmitting the first packet for which the reception circuit has detected an error, the determination circuit allocates the same first identifier as the first identifier of the first packet for which the error has been detected as a first identifier of a first packet that is to be retransmitted, and allocates a second identifier different from the second identifier of the first packet for which the error has been detected as a second identifier of the first packet that is to be retransmitted.

4. A transmission and reception device comprising:
   a storage circuit configured to store, for each first identifier that is allocated for identifying a first packet, use situation information indicating whether the first identifier is in use and situation information indicating a second identifier that is allocated along with the first identifier;
   a reception circuit configured to receive a packet that is addressed to the transmission and reception device;
   an updating circuit configured to update the situation information stored in the storage circuit on the basis of a reception result by the reception circuit of a second packet indicating an execution result of processing that has been requested by the first packet, wherein the updating circuit sets the use situation information to indicate that the first identifier is in use when the first identifier is allocated for identifying the first packet and sets the use situation information to indicate that the first identifier is not in use when the second packet is received by the reception circuit;
   a determination circuit configured to determine the first identifier and the second identifier that are allocated to the first packet on the basis of the situation information stored in the storage circuit; and
   a first transmission circuit configured to generate and transmit the first packet storing the first identifier and the second identifier that have been determined by the determination circuit.

5. A control method of an information processing device comprising an arithmetic operation processing device, a plurality of input/output devices, and a plurality of communication devices configured to perform communication between the arithmetic operation processing device and the plurality of input/output devices, the control method comprising:
   receiving a packet addressed to a first communication device that belongs to the plurality of communication devices and that transmits a first packet, by a reception circuit of the first communication device, the first communication device including a storage circuit configured to store, for each first identifier that is allocated for identifying the first packet, use situation information indicating whether the first identifier is in use and situation information indicating a second identifier that is allocated along with the first identifier;
   updating the situation information stored in the storage circuit on the basis of a reception result by the reception circuit of a second packet indicating an execution result of processing that has been requested by the first packet, by an updating circuit of the first communication device, wherein the updating circuit sets the use situation information to indicate that the first identifier is in use when the first identifier is allocated for identifying the first packet and sets the use situation information to indicate that the first identifier is not in use when the second packet is received by the reception circuit;

determining the first identifier and the second identifier that are allocated to the first packet on the basis of the situation information stored in the storage circuit, by a determination circuit of the first communication device;

generating and transmitting the first packet storing the first identifier and the second identifier that have been determined by the determination circuit, by a first transmission circuit of the first communication device; and transmitting the second packet by a second transmission circuit of a second communication device that belongs to the plurality of communication devices and that is a transmission destination of the first packet, after storing the second identifier stored by the first packet in the second packet when transmitting the second packet as a response to the first packet that has been transmitted by the first communication device.

\* \* \* \* \*